United States Patent
Zhang et al.

(10) Patent No.: US 10,415,162 B2
(45) Date of Patent: Sep. 17, 2019

(54) IMPACT RESISTANT, SHRINKABLE KNITTED TUBULAR SLEEVE AND METHOD OF CONSTRUCTION THEREOF

(71) Applicant: Federal-Mogul Powertrain, LLC, Southfield, MI (US)

(72) Inventors: Zhong Huai Zhang, Pottstown, PA (US); Xiaodan Qiu, Exton, PA (US); Linwood Ludy, Pottstown, PA (US); Ali Khosroshahi, Cary, NC (US); Leigh Krauser, Coatesville, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 0 days.

(21) Appl. No.: 15/684,875

(22) Filed: Aug. 23, 2017

(65) Prior Publication Data

US 2018/0057977 A1 Mar. 1, 2018

Related U.S. Application Data

(60) Provisional application No. 62/378,992, filed on Aug. 24, 2016.

(51) Int. Cl.
*D03D 15/04* (2006.01)
*D03D 1/00* (2006.01)
(Continued)

(52) U.S. Cl.
CPC .......... *D03D 15/04* (2013.01); *D03D 1/0041* (2013.01); *D03D 3/02* (2013.01); *D03D 15/12* (2013.01);
(Continued)

(58) Field of Classification Search
CPC .......... D03D 15/04; D03D 15/12; D03D 3/02; D04B 1/225; D04B 1/22; D04B 1/123;
(Continued)

(56) References Cited

U.S. PATENT DOCUMENTS

| 2,738,566 A | 3/1956 | Scott, Jr. | |
| 3,685,316 A * | 8/1972 | Robinson | D04B 1/24 66/177 |

(Continued)

FOREIGN PATENT DOCUMENTS

DE 102007023062 A1 * 11/2008 .......... B29C 1/0658

OTHER PUBLICATIONS

International Search Report, dated Dec. 12, 2017 (PCT/US2017/048304).

*Primary Examiner* — Camie S Thompson
(74) *Attorney, Agent, or Firm* — Robert L. Stearns; Dickinson Wright, PLLC

(57) ABSTRACT

A knitted sleeve for routing and protecting elongate members and method of construction thereof are provided. The sleeve includes an elongate, knitted wall having a circumferentially continuous, tubular outer periphery extending along a central axis between opposite open ends. The wall includes knitted shrinkable yarn and knitted non-shrinkable yarn. The shrinkable yarn provides the wall with an ability to be radially constricted from a first, diametrically enlarged state to a second, diametrically shrunken state, wherein said shrinkable yarn and said non-shrinkable yarn are knit in alternating groups of courses with one another.

21 Claims, 9 Drawing Sheets

(51) Int. Cl.
  *D03D 3/02* (2006.01)
  *D03D 15/12* (2006.01)
  *H02G 3/04* (2006.01)
  *D04B 1/22* (2006.01)
  *D04B 1/12* (2006.01)

(52) U.S. Cl.
  CPC .............. *D04B 1/12* (2013.01); *D04B 1/225* (2013.01); *H02G 3/04* (2013.01); *D10B 2331/00* (2013.01); *D10B 2401/041* (2013.01); *D10B 2403/0231* (2013.01); *D10B 2403/0241* (2013.01); *D10B 2505/12* (2013.01)

(58) Field of Classification Search
  CPC ...... H02G 3/04; H02G 3/0481; H02G 3/0412; Y10T 428/1334; D07B 2801/22; D07B 2201/2097; D07B 201/20907; F16L 57/04; F16L 59/021; F16L 59/145
  USPC .................. 428/36.1, 35.2; 138/123; 173/93
  See application file for complete search history.

(56) References Cited

U.S. PATENT DOCUMENTS

| | | |
|---|---|---|
| 5,366,771 A | 11/1994 | Beersel et al. |
| 7,647,946 B2 | 1/2010 | Mirmand et al. |
| 2003/0089971 A1 | 5/2003 | Akers et al. |
| 2007/0240896 A1 | 10/2007 | Ott et al. |
| 2011/0177294 A1 | 7/2011 | Rock et al. |
| 2013/0224408 A1 | 8/2013 | Malloy et al. |
| 2016/0076176 A1 | 3/2016 | Rock et al. |
| 2018/0002843 A1* | 1/2018 | Henin .................... D04B 21/18 |

* cited by examiner

IMPACT RESISTANT, SHRINKABLE KNITTED TUBULAR SLEEVE AND METHOD OF CONSTRUCTION THEREOF

CROSS-REFERENCE TO RELATED APPLICATION

This application claims the benefit of U.S. Provisional Application Ser. No. 62/378,992, filed Aug. 24, 2016, which is incorporated herein by reference in its entirety.

BACKGROUND OF THE INVENTION

1. Technical Field

This invention relates generally to textile sleeves for protecting elongate members, and more particularly to shrinkable knitted tubular sleeves.

2. Related Art

It is known to contain elongate members, such as wires, wire harnesses, cables and conduits of various types in knitted sleeves to provide protection to the elongate members against impact and abrasion, fluid and thermal affects. In applications where high impact resistance is needed to prevent damage to the sleeve and the contents therein, both wrappable and circumferentially continuous, tubular sleeves are known. Though each can be made to provide suitable protection against impact forces and abrasion, each comes with drawbacks. Wrappable sleeves require secondary features to secure them about the elongate member being protected, such as clamps, straps, tapes and the like, and thus, additional labor and time is required during assembly, thereby increasing the cost of assembly. Further, having to keep the secondary features in stock is costly. Further yet, the secondary feature can present a possibility of coming undone during use, thereby risking direct exposure of the elongate member to environmental effects. In addition, wrappable sleeves typically have a non-uniform thickness with opposite edges being overlapped on one another, and thus, the outer envelop/surface of the sleeve has a non-uniform appearance having an increased thickness region that can prevent it from being used in tight areas, or otherwise make assembly difficult. Another drawback to wrappable sleeves is the need to keep different sizes in stock for different diameter applications, and this further increases inventory and cost. In addition, in order to provide the desired impact resistance, it is generally necessary to form the wall being relatively thick, which can lead to the inability to use the wrappable sleeve in relatively tight spaces.

With regard to circumferentially continuous, tubular sleeves, as with wrappable sleeves, a need to keep different sizes in stock for different diameter applications exists. Further, tubular sleeves are commonly fixed in diameter, and as such, it can be difficult or impossible to use this type of sleeve in applications where the elongate member has one or more regions of increased size relative to the inner diameter of the sleeve, such that the sleeve will not fit over the increased size region(s), wherein the increased size region(s) could be presented by an enlarged mechanical or electrical connector, for example. Further, fixed diameter tubular sleeves typically require secondary fasteners to secure them in position, such as by applying a tape about one or both of the ends and on the member extending through the sleeve, for example, and thus, they suffer from the same drawbacks discussed above for wrappable sleeves. In addition, as discussed above, in order to provide the desired impact resistance, it is generally necessary to form the wall being relatively thick, thus taking away from the ability to use the sleeve in relatively tight spaces.

SUMMARY OF THE INVENTION

One aspect of the invention provides a textile sleeve for routing and protecting elongate members. The sleeve includes an elongate, knitted wall having a circumferentially continuous, tubular outer periphery extending along a central axis between opposite open ends. The wall includes shrinkable yarn and non-shrinkable yarn. The shrinkable yarn provides the wall with an ability to be radially constricted from a first, diametrically enlarged state to a second, diametrically shrunken state, wherein the shrinkable yarn and the non-shrinkable yarn are knit in alternating groups of courses with one another.

In accordance with another aspect of the invention, the ratio of the diameter of the first, diametrically enlarged state to the second, diametrically shrunken state is about 1.5:1 to 5:1 or greater.

In accordance with another aspect of the invention, the shrinkable yarn is knit on one of even or odd needles and the non-shrinkable yarn is knit on the other of even or odd needles.

In accordance with another aspect of the invention, the shrinkable yarn is knit in one of an interlock stitch pattern or a jersey stitch pattern.

In accordance with another aspect of the invention, the non-shrinkable yarn is knit in an ottoman stitch pattern.

In accordance with another aspect of the invention, the non-shrinkable yarn is knit having circumferentially extending floats, wherein the floats are formed by skipping at least one even needle if the non-shrinkable yarn is knit on even needles or by skipping at least one odd needle if the non-shrinkable yarn is knit on odd needles, wherein the floats form radially inwardly facing cushions that provide enhanced impact protection to the elongate member being protected.

In accordance with another aspect of the invention, the floats can be formed on 1 to 4 immediately adjacent courses.

In accordance with another aspect of the invention, the shrinkable yarn can be provided as a monofilament.

In accordance with another aspect of the invention, the shrinkable yarn can be provided as a multifilament.

In accordance with another aspect of the invention, the non-shrinkable yarn can be provided as a monofilament.

In accordance with another aspect of the invention, the non-shrinkable yarn can be provided as a multifilament.

In accordance with another aspect of the invention, the non-shrinkable yarn can be an air texturized multifilament.

In accordance with another aspect of the invention, the non-shrinkable yarn can be provided as at least one or more of PET, nylon, PP, PE, PPS, PEEK, and Nomex.

In accordance with another aspect of the invention, the wall can have a first density when in the first, diametrically enlarged assembly state and a second density when in the second, diametrically constricted state, with the second density being about 2 times greater or more than the first density.

In accordance with another aspect of the invention, the wall can be knit including low melt fusible yarn that has a melt temperature that is less than the temperature required to shrink the shrinkable yarn and less than the melt temperature of the non-shrinkable yarn.

In accordance with another aspect of the invention, the low melt fusible yarn can be twisted or served with the shrinkable yarn.

In accordance with another aspect of the invention, the low melt fusible yarn can be twisted or served with the non-shrinkable yarn.

In accordance with yet another aspect of the invention, a method of constructing a knitted sleeve for routing and protecting elongate members is provided. The method includes knitting a wall having a circumferentially continuous, tubular outer periphery extending along a central axis between opposite open ends with shrinkable yarn and non-shrinkable yarn. Further, providing the shrinkable yarn having an ability to be shrunken to radially constrict the wall from a first, diametrically enlarged state to a second, diametrically constricted state, wherein the shrinkable yarn is knit on one of even or odd needles and the non-shrinkable yarn is knit on the other of even or odd needles.

In accordance with another aspect of the invention, the method can further include knitting the wall such that the ratio of the respective diameters of the first, diametrically enlarged assembly state to the second, diametrically constricted state is about 1.5:1 to 5:1 or greater.

In accordance with another aspect of the invention, the method can further include knitting the shrinkable yarn on one of even or odd needles and knitting the non-shrinkable yarn on the other of even or odd needles.

In accordance with another aspect of the invention, the method can further include knitting the shrinkable yarn in one of an interlock stitch pattern or jersey stitch pattern.

In accordance with another aspect of the invention, the method can further include knitting the non-shrinkable yarn in an ottoman stitch pattern.

In accordance with another aspect of the invention, the method can further include knitting the non-shrinkable yarn having circumferentially extending floats, wherein the floats are formed by skipping at least one even needle if the non-shrinkable yarn is knit on even needles or by skipping at least one odd needle if the non-shrinkable yarn is knit on odd needles, wherein the floats form radially inwardly facing cushions that provide enhanced impact protection to the elongate member being protected.

In accordance with another aspect of the invention, the method can further include forming the floats on 1 to 4 immediately adjacent courses.

In accordance with another aspect of the invention, the method can further include providing the shrinkable yarn as a monofilament.

In accordance with another aspect of the invention, the method can further include providing the shrinkable yarn as a multifilament.

In accordance with another aspect of the invention, the method can further include providing the non-shrinkable yarn as a monofilament.

In accordance with another aspect of the invention, the method can further include providing the non-shrinkable yarn as a multifilament.

In accordance with another aspect of the invention, the method can further include providing the non-shrinkable yarn as a highly texturized multifilament.

In accordance with another aspect of the invention, the method can further include providing the non-shrinkable yar as at least one or more of PET, nylon, PP, PE, PPS, PEEK, and Nomex.

In accordance with another aspect of the invention, the method can further including knitting the wall having a first density when in the first, diametrically enlarged state and a second density when in the second, diametrically constricted state, with the second density being about 2 times greater or more than the first density.

In accordance with another aspect of the invention, the method can further include knitting the wall including low melt fusible yarn having a melt temperature that is less than the melt temperature of the shrinkable yarn and the non-shrinkable yarn.

In accordance with another aspect of the invention, the method can further include twisting or server the low melt fusible yarn with the shrinkable yarn.

In accordance with another aspect of the invention, the method can further include twisting or server the low melt fusible yarn with the non-shrinkable yarn.

In accordance with another aspect of the invention, the method can further include knitting the circumferentially continuous wall on a flat-bed knitting machine.

In accordance with another aspect of the invention, the method can further include knitting the circumferentially continuous wall on a circular knitting machine.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
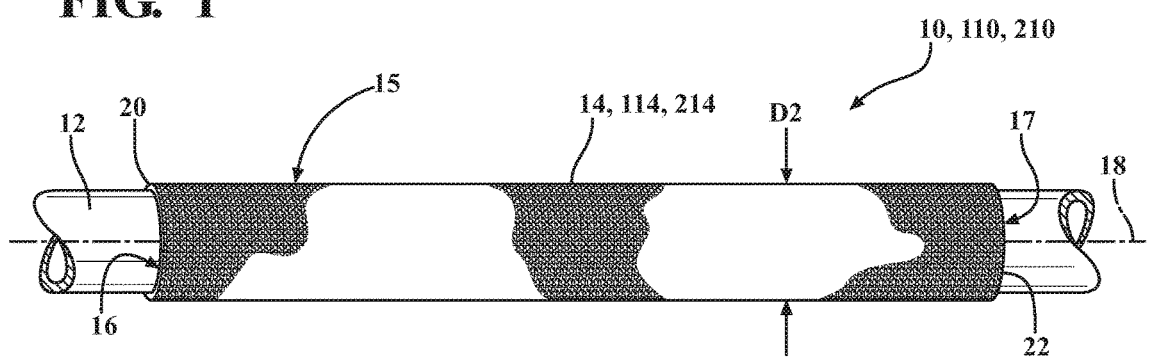
FIG. 1 is a schematic side view of a tubular, knitted sleeve shown in accordance with one aspect of the invention, with the sleeve shown in a shrunken assembled state about an elongate member to be protected.
Figure 2:
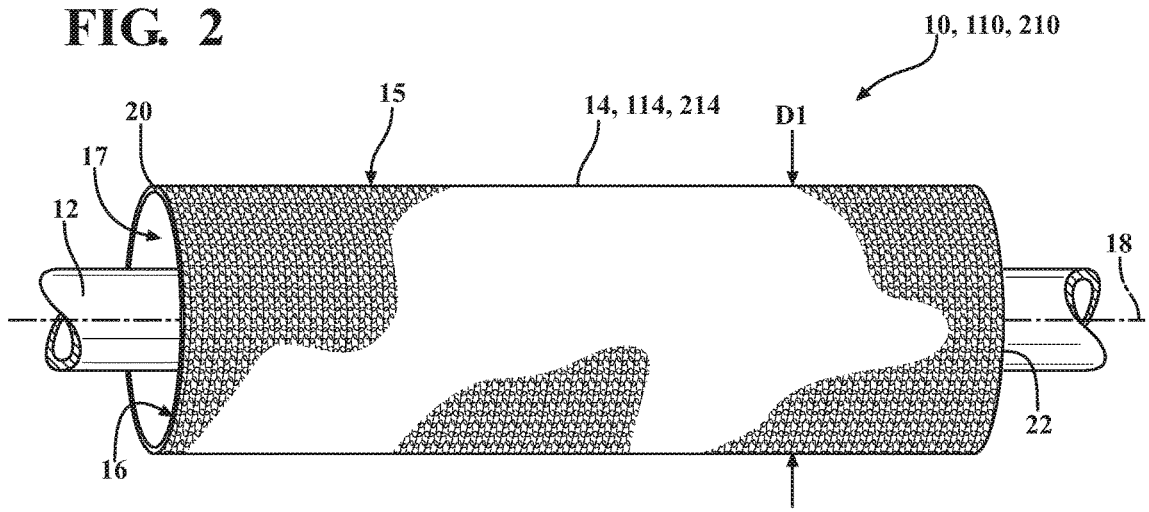
FIG. 2 is a side view of a knitted sleeve in accordance with one aspect of the invention shown in an "as knit", non-shrunken assembly state.

Referring in more detail to the drawings, FIGS. 1 and 2 schematically illustrate a knitted protective tubular sleeve, referred to hereafter as sleeve 10, constructed in accordance with one aspect of the disclosure. In FIG. 1, the sleeve 10 is shown disposed about an elongate member 12 to be protected, with the sleeve 10 shown in a second, diametrically shrunken, fully assembled state about the elongate member 12, referred to hereafter as, assembled state, shrunken state and/or second state. In FIG. 2, the sleeve 10 is shown in an "as knit", first, diametrically enlarged, non-shrunken assembly state, referred to hereafter as, assembly state, non-shrunken state and/or first state. The sleeve 10 has an elongate, knitted wall 14 having a circumferentially continuous, tubular outer periphery, also referred to as outer surface 15, and an inner surface 16 bounding an inner cavity 17 extending along a central longitudinal axis 18 between opposite open ends 20, 22. It is to be understood that by being circumferentially continuous and tubular, that the sleeve 10 does not have lengthwise extending free side edges, such as would be found in a wrappable sleeve, and thus, the sleeve 10 is not capable of being opened along its length. The wall 14 includes at least two different types of yarn, including at least one highly shrinkable yarn 24 and at least one non-shrinkable, or substantially non-shrinkable yarn, referred to hereafter as non-shrinkable yarn 26. It is to be recognized that by substantially non-shrinkable, what is meant is that the yarn 26 is not marketed or otherwise considered by one skilled in the art as being shrinkable, and that although it may shrink somewhat, such as between about 1-10% of its original length, this is nowhere near the extent of shrinkage as provided by the highly shrinkable yarn 24, which shrinks about 20% or more of its original length. As such, upon knitting the sleeve 10, the wall 14 has both circumferentially extending knit courses 28 of the shrinkable yarn 24 and circumferentially extending knit courses 30 of the non-shrinkable yarn 26 interlinked via knit stitches with one another. Upon knitting the sleeve 10, the elongate member 12 can be easily disposed through the cavity 17, such as wires, a wire harness, or conduit, for example, while the sleeve 10 is in the enlarged, non-shrunken first state. As a result of the wall 14 being non-shrunken "as knit", the elongate member 12 is able to be easily fed through the cavity 17 of the sleeve 10 without getting snagged or caught up. Then, with the sleeve 10 properly positioned along the elongate member 12, the sleeve 10 is heated to a sufficient temperature to cause the shrinkable yarns 24 to shrink lengthwise, thereby causing the wall 14 to constrict significantly in diameter into close, snug abutment with an outer surface of the elongate member 12, such in a respective ratio between about 1.5:1 to 5:1 or greater. Accordingly, the single sleeve 10 is useful to be assembled over a wide range of elongate member diameters without having to have a separate sleeve for each different diameter elongate member 12. Other benefits, aside from not needing a wide assortment of differently sized sleeves for each different application include, not needing secondary fasteners to maintain the sleeve 10 in fixed relation to the elongate member 12 due to the wall 14 becoming shrunk into a snug fit about the elongate member 12, providing enhanced impact protection to the elongate member 12 due to the altered configuration of at least a portion of the non-shrinkable yarn 26, minimizing the outer envelop of the shrunken sleeve 10, among others, which will become apparent to one possessing ordinary skill in the art upon viewing the entirety of the disclosure herein.

As discussed above, with the shrinkable yarn 24 being knit in a non-shrunken state, the sleeve 10 is formed with the wall 14 being enlarged and stretchable such that the cavity 17 is suitably sized and can be enlarged diametrically to readily receive the elongate member 12 therethrough. The ratio between the first, "as knit" diameter and the second, as shrunken diameter is at least 1.5:1, and preferably 2:1 or greater, and more preferably 3:1 or greater, and as high as about 10:1 or greater. At such, if the elongate member 12 has enlarged fittings, connectors, oddly shaped branches, and/or the like, the elongate member 12 can still be easily inserted through the cavity 17 of the sleeve 10 while the cavity 17 is in the enlarged, non-shrunken first state. Upon disposing the elongate member 12 through the cavity 17, the wall 14 can be activated to shrink into close fit, snug abutting relation about the elongate member 12 (FIG. 1) via selected application of at least one of heat, fluid, and ultraviolet radiation, depending on the type of shrinkable yarn 24 used. Accordingly, the sleeve 10 becomes fixed and located about the elongate member 12 against axial dislocation without need of secondary fixation mechanisms, thereby doing away for the need for clamps, straps, tape, or the like. Further yet, the knit wall 14 becomes densified upon being shrunken, and thus, the protective attributes of the wall 14, such as impact resistance, abrasion resistance, impermeability, among other things, are greatly increased. For example, the density can increase from a first density in the non-shrunken state to a second density in the shrunken state by about 2 times or greater, and in one sample, the density increased from 169 $kg/m^3$ to 486 $kg/m^3$, by way of example and without limitation. In addition, with the single layer wall 14 being brought into a close, snug fit about the elongate member 12 as a result of the highly shrinkable yarns 24, the thickness and outer envelop of the wall 14 is minimized, thereby being useful in tight areas. In one sample, the finish thickness of the wall 14 was about 3.4 mm, by way of example and without limitation.

The shrinkable yarn 24 can be provided as either a multifilament and/or monofilament. Further, the shrinkable yarn 24 can be provided having a denier ranging between about 50 to 10000.

The non-shrinkable or substantially non-shrinkable yarn 26 can be provided as a multifilament(s) and/or monofilament(s) of at least one or more of PET, nylon, PP, PE, PPS, PEEK, and Nomex material yarn(s). The denier of the non-shrinkable yarn 26 can range from about 50 to 10000. It has been found that relatively bulky multifilaments provide the increased loft to further facilitate dampening impact forces, while also enhancing flexibility of the sleeve 10. The number of yarn ends, including shrinkable and non-shrinkable yarns 24, 26, can be adjusted as desired for the intended application.

Figure 3:
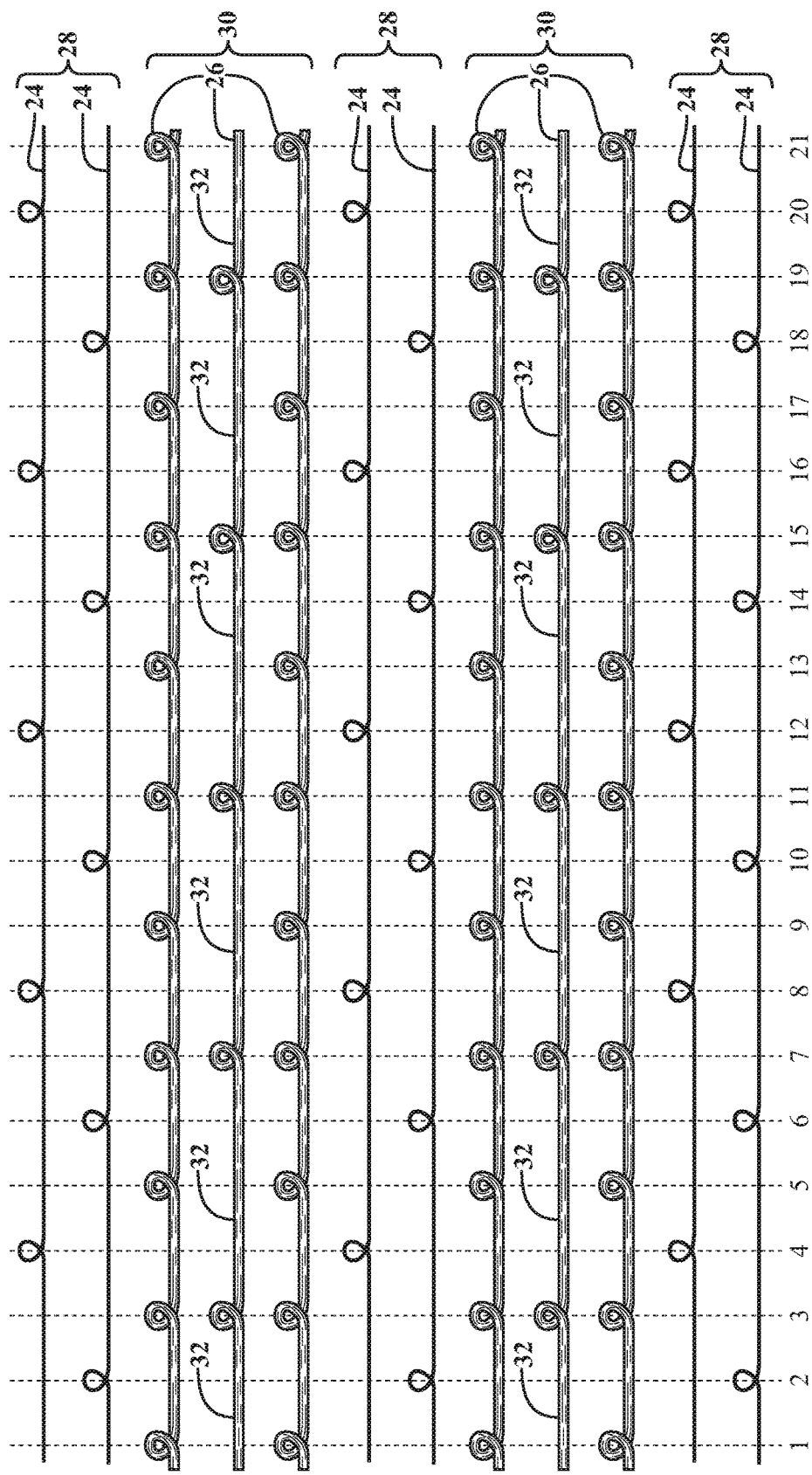
FIG. 3 is a knitting stitch pattern in accordance with one aspect of the invention used to knit a sleeve as schematically shown in FIGS. 1 and 2.
Figure 4:
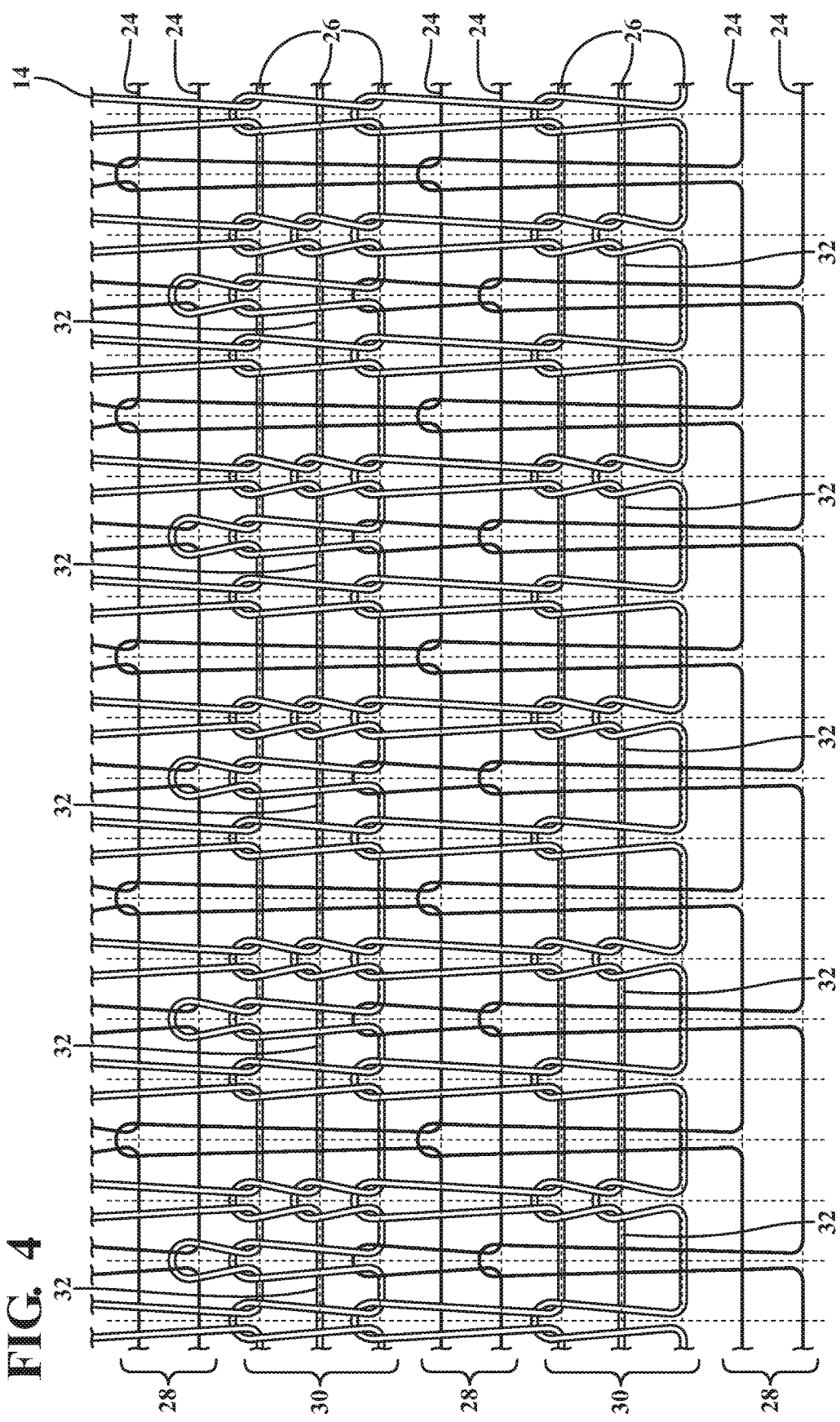
FIG. 4 is a diagram of a knitted structure formed from the knitting stitch pattern of FIG. 3.

In one embodiment illustrated in FIGS. 3 and 4, the wall 14 of a sleeve 10, constructed in accordance with one aspect of the disclosure, was knit with shrinkable and non-shrinkable yarns 24, 26, with the shrinkable yarn(s) 24 being knit in an interlock stitch pattern and the non-shrinkable yarn(s) knit in an ottoman stitch pattern (FIG. 3), resulting the knit structure as shown in FIG. 4. As shown in FIGS. 3 and 4, by way of example and without limitation, the shrinkable yarn 24 can be knit in a plurality of circumferentially extending courses, shown as pairs of immediately adjacent courses 28, with each pair, also referred to as group, of courses 28 of shrinkable yarn 24 being spaced from one another by a plurality of courses 30 of non-shrinkable yarn 26, shown, by way of example and without limitation, as three courses 30. In one embodiment, the shrinkable yarn 24 was provided as a 0.30 mm cross-linked polyethylene monofilament and the non-shrinkable yarn 26 was provided as a 600 denier, air texturized polyethylene terephthalate (PET) multifilament, both by way of example and without limitation. It is to be recognized that other sizes and material types of shrinkable and non-shrinkable yarns 24, 26 desired and suitable for the intended application can be used. Upon knitting the wall 14, the wall 14 had a non-shrunk density of about 169 kg/m$^3$, and after shrinking the sleeve 10, the wall 14 had a density of about 486 kg/m$^3$, with a finished, shrunken inner diameter of about 10 mm, by way of example and without limitation. The knitting can be performed on any suitable knitting machine capable of forming a circumferentially continuous wall, such as a flat-bed knitting machine or via a circular knitting machine, by way of example and without limitation.

Figure 7:
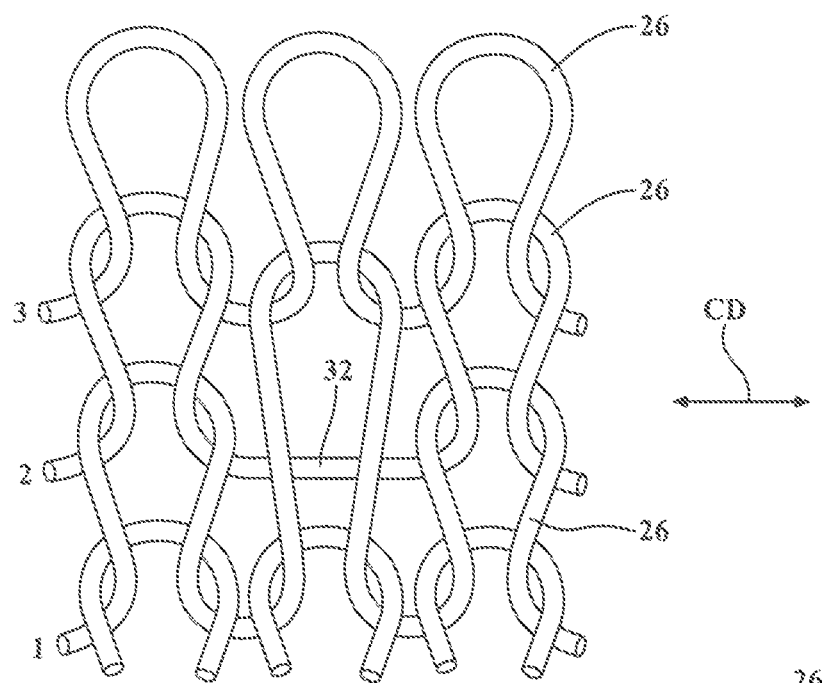
FIG. 7 is an enlarged, fragmentary view of a portion of the knitted structure of FIG. 4.
Figures 7A, 7B:
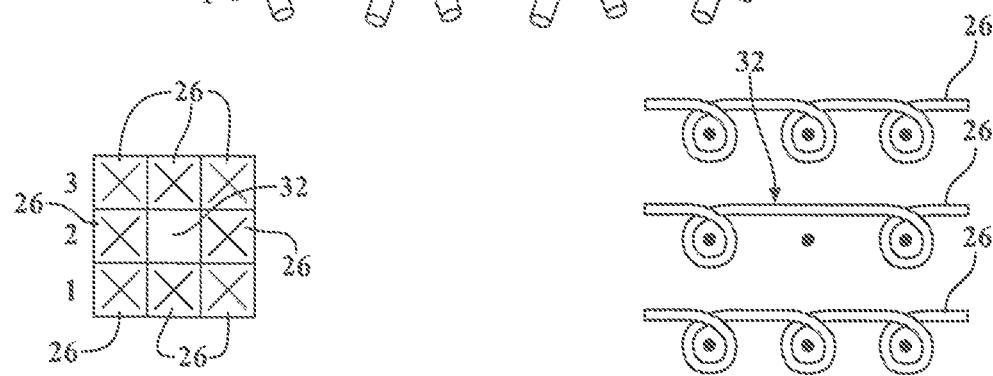
FIG. 7A is a diagrammatic representation of the fragmentary knitted structure of FIG. 7.
FIG. 7B is a knitting stitch pattern of the fragmentary knitted structure of FIG. 7.
Figure 8:
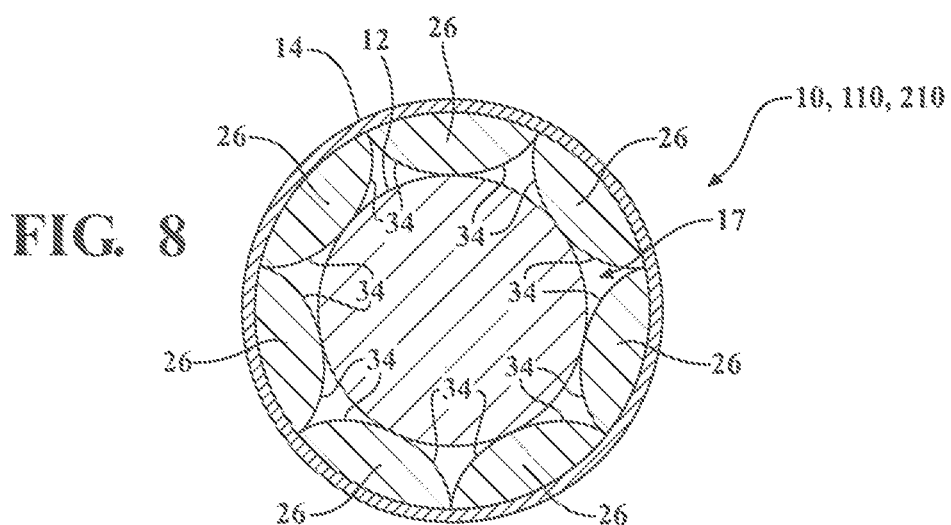
FIG. 8 is a schematic cross-sectional end view of a knitted sleeve constructed in accordance with one aspect of the invention showing radially inwardly extending cushions of knitted yarn that provide enhanced impact protection to an elongate member being protected within a cavity of the sleeve.

Within each separate course 28 of the shrinkable yarn 24, the shrinkable yarn 24 was knit on one of either even needles or odd needles, shown as being knit on each even needle within each course 28 in which the shrinkable 24 yarn is knit, by way of example and without limitation. The non-shrinkable yarn 26 was knit on the other of the even needles or odd needles, shown as being knit on the odd needles, by way of example and without limitation. In contrast to the heat shrinkable yarn 24, which was knit (looped) on each even needle without skipping an even needle, the non-shrinkable yarn 26 within at least one of the circumferentially extending courses 30 of each group of three courses 30 skips at least one needle (not looped). In the embodiment shown, the non-shrinkable yarn 26 in the middle course 30 within each group of three courses 30 is shown as being looped about alternating odd needles (3, 7, 11 . . . ) and skipping every other odd needle (5, 9, 13 . . . ), thereby forming floats 32 of the non-shrinkable yarn 26 over the skipped needles. The resulting knitted structure is shown in FIG. 4, and an enlarged view of a section of the structure of the non-shrinkable yarn 26 is shown in FIG. 7, with a diagrammatic view of the stitch pattern being shown in FIGS. 7A and 7B, as will be readily understood by one possessing ordinary skill in the knitting art. As can be seen in FIG. 7, the floats 32 are formed by the middle non-shrinkable yarn 26 (number 2 of the three yarns 1, 2, 3) along the inner surface 16 of the wall 14, with the floats 32 extending in the circumferential direction CD. The floats 32, upon shrinking the sleeve 10 about the elongate member 12 and causing the wall 14 to be constricted circumferentially into a reduced diameter, snug fit with the elongate member 12 via activation of the shrinkable yarn 24 via application of heat, liquid, ultraviolet radiation, or pressure (depending on the type of heat-shrinkable yarn used), bulge and extend radially inwardly into abutment with an outer surface of the elongate member 12, as shown schematically in FIG. 8. As such, the bulged floats 32 form individual radially inwardly extending, lofted pillows or cushions, and referred to hereafter as dampeners 34, which function to greatly diminish the transference of impact forces to the elongate member 12, while also acting to dampen vibration. Accordingly, the elongate member 12 is surrounded about its circumference by the plurality of bulged dampeners 34, and thus, the elongate member 12 is greatly protected against external impact forces and against sources of vibration.

Figure 5:
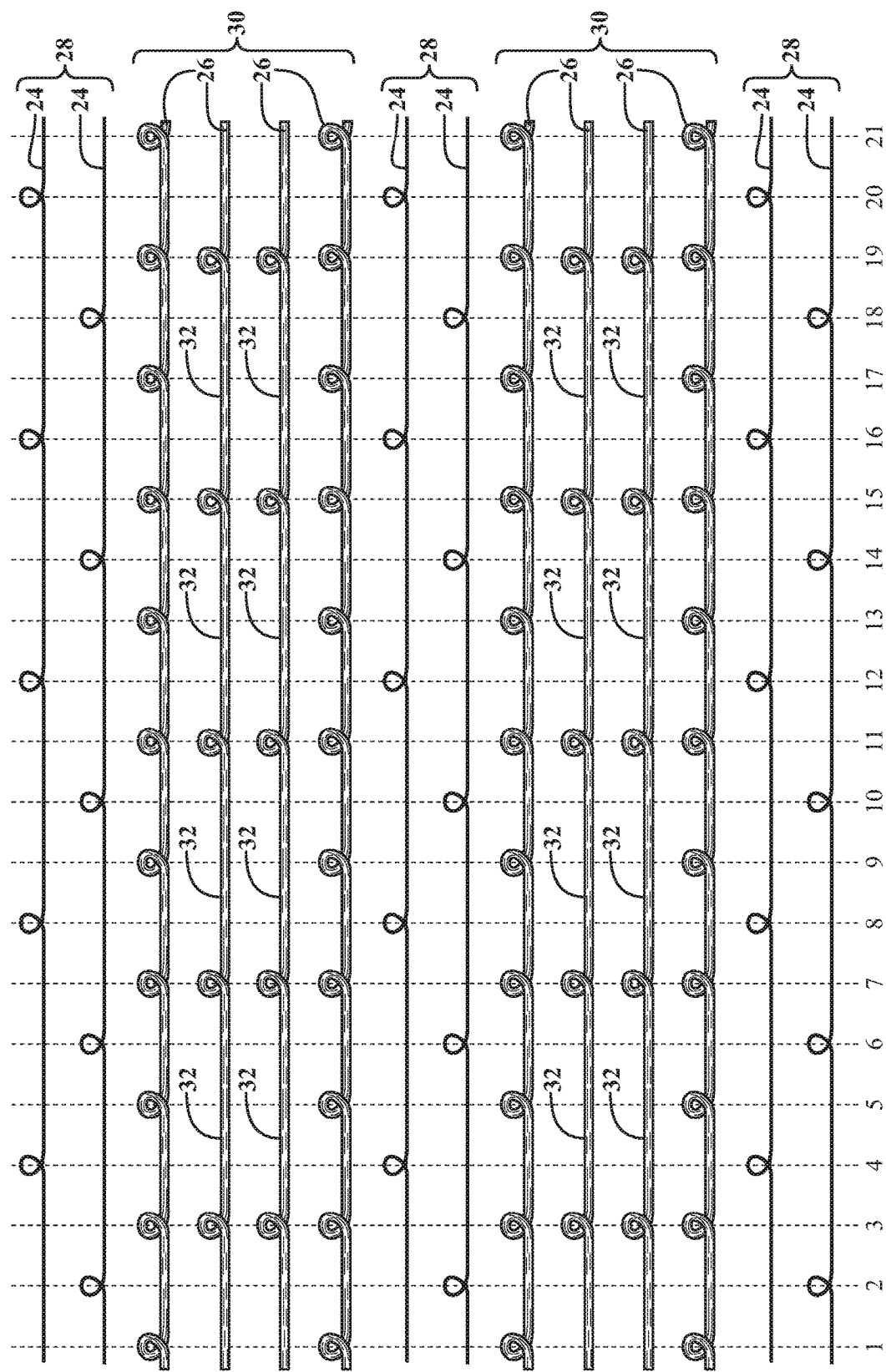
FIG. 5 is a knitting stitch pattern in accordance with another aspect of the invention used to knit a sleeve as schematically shown in FIGS. 1 and 2.
Figure 6:
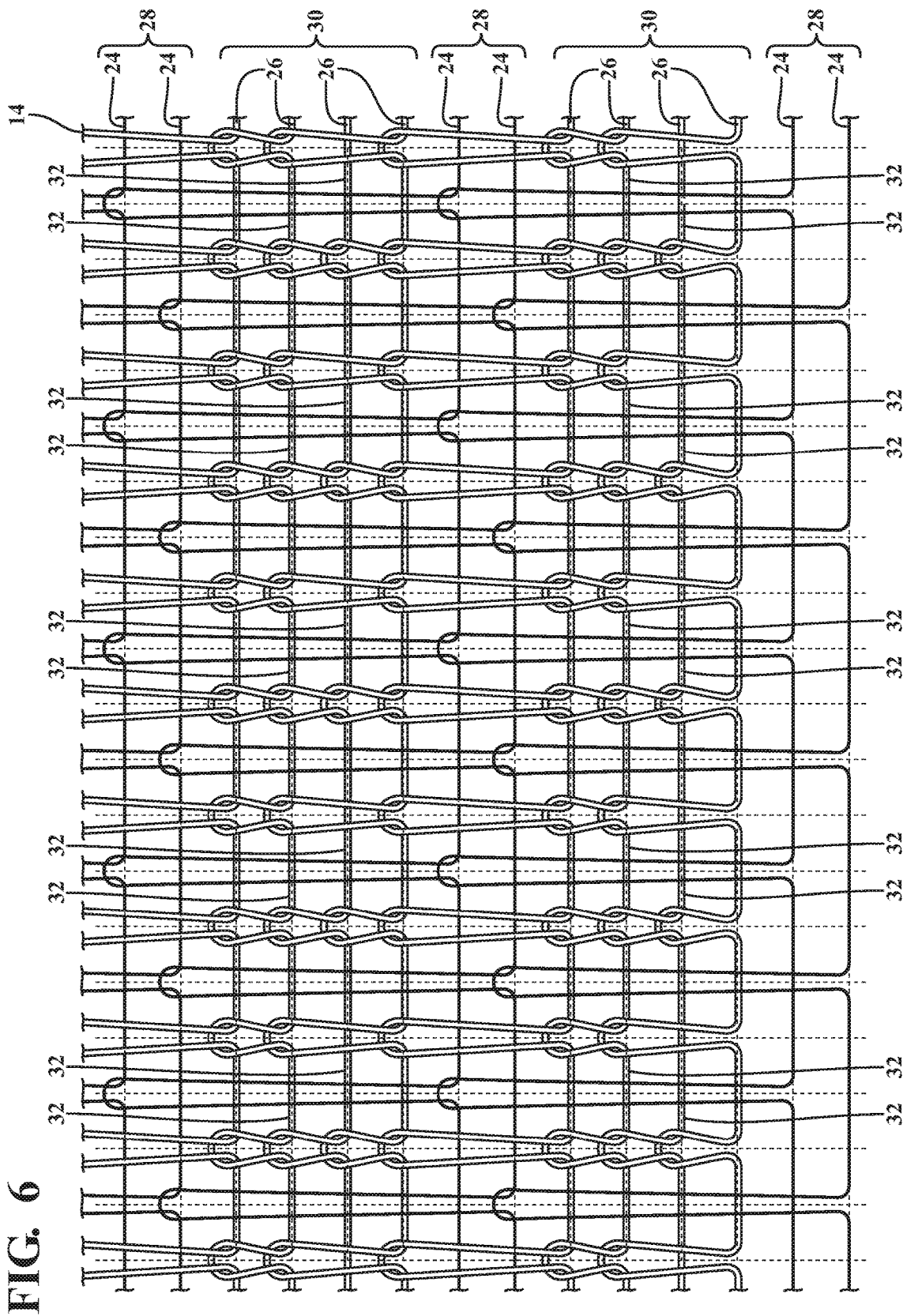
FIG. 6 is a diagram of a knitted structure formed from the knitting stitch pattern of FIG. 5.

In another embodiment illustrated in FIGS. 5 and 6, wherein similar reference numerals as used above are used to indicate like features, offset by a factor of 100 wherein appropriate to indicate a difference embodiment, a wall 114 of a sleeve 110, constructed in accordance with another aspect of the invention, was knit similarly that described above with regard to FIGS. 3 and 4, with shrinkable yarns 24 knit in an interlock stitch pattern and the non-shrinkable yarns 26 knit in an ottoman stitch pattern (FIG. 5), resulting the knit structure as shown in FIG. 6. The shrinkable yarn 24 was knit the same as discussed above, namely, in a plurality of circumferentially extending courses, shown as pairs of immediately adjacent courses 28, with each pair of courses 28 of shrinkable yarn 24 being spaced from one another by the a plurality of courses 30 of non-shrinkable yarn 26. However, the plurality of courses 30 of non-shrinkable yarn 26, rather than being knit in groups of three courses, was knit in groups containing 4 courses 30. As discussed above, the non-shrinkable yarn 26 within at least one course 30 within each group of four courses 30 skips at least one or more needles. In the embodiment shown, the non-shrinkable yarn 26 in the middle two courses 30 within each group of four courses 30 is shown as being looped about alternating odd needles (3, 7, 11 . . . ) and skipping every other odd needle (5, 9, 13 . . . ), thereby forming floats 32 of the non-shrinkable yarn 26 over the skipped needles. The resulting knitted structure is shown in FIG. 6, wherein the floats 32 within a common group of four non-shrinkable yarns 26 are formed in immediately adjacent relation one another, with the adjacent floats 32 being aligned axially with one another along a lengthwise extending direction along the longitudinal axis 18. It should be recognized that the floats 32 can be positioned as desired, depending on the particular knit stitch patter used, and thus, the floats 32 within each group could be staggered circumferentially relative to one another, rather than being axially aligned, if desired. Otherwise, the knit wall 114 of the embodiment of FIGS. 5 and 6 is the same as discussed above, whereupon the floats 32 form radially inwardly extending dampeners 34 upon shrinking the wall 114.

Figure 9:
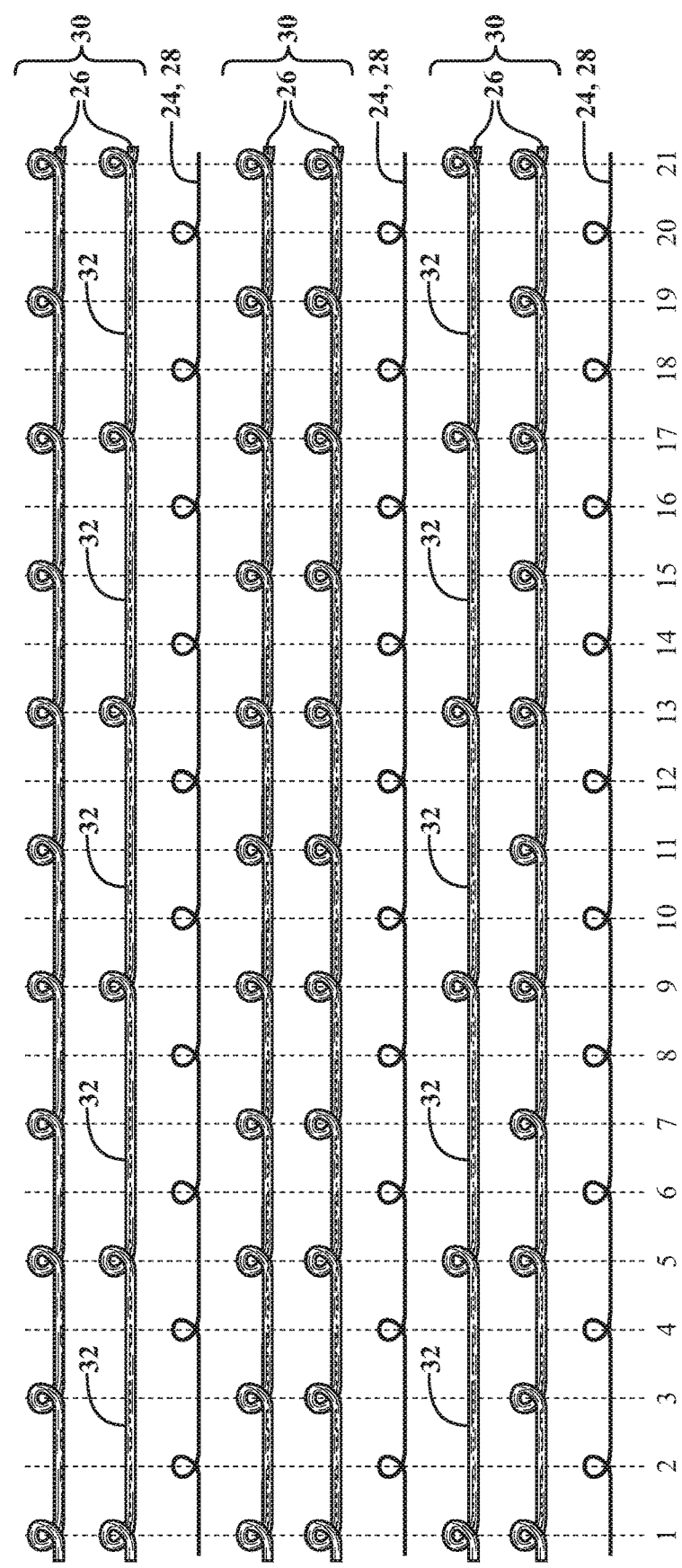
FIG. 9 is a knitting stitch pattern in accordance with another aspect of the invention used to knit a sleeve as schematically shown in FIGS. 1 and 2.
Figure 10:
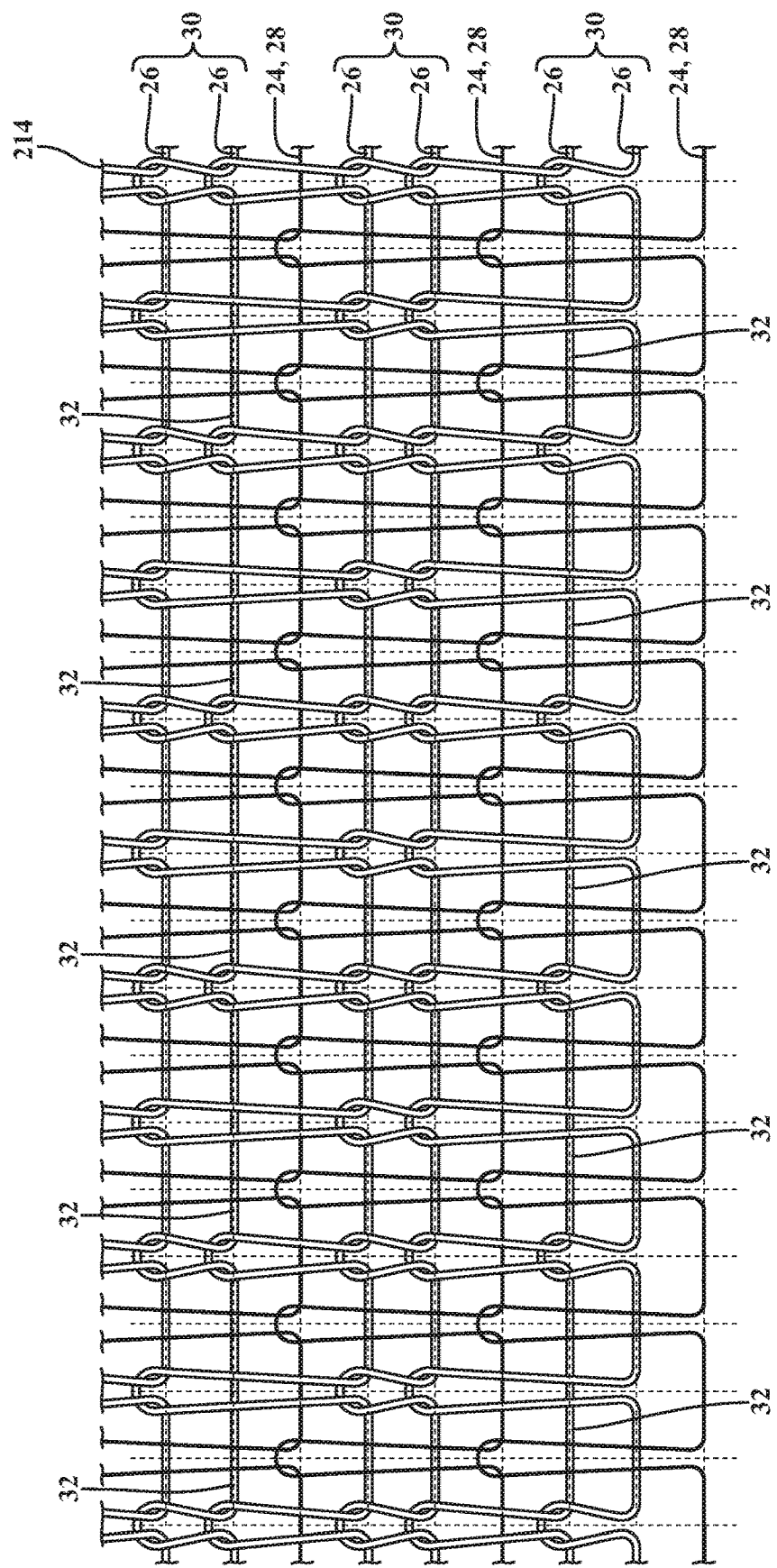
FIG. 10 is a diagram of a knitted structure formed from the knitting stitch pattern of FIG. 9.

In another embodiment illustrated in FIGS. 9 and 10, wherein similar reference numerals as used above are used to indicate like features, offset by a factor of 200 wherein appropriate to indicate a difference embodiment, a wall 214 of a sleeve 210 was knit similarly that described above with regard to FIGS. 3 and 4, with shrinkable yarns 24; however, rather than knitting the shrinkable yarns 24 in an interlock stitch pattern, the shrinkable yarns 24 were knit in a jersey stitch pattern. The non-shrinkable yarns 26 were knit in an ottoman stitch pattern, resulting in the knit structure as shown in FIG. 10. The shrinkable yarn 24 was knit in single courses 28, with each course 28 of shrinkable yarn 24 being spaced from one another by the a plurality of courses 30 of non-shrinkable yarn 26, shown as a pair of courses 30, by way of example and without limitation. As discussed above, the non-shrinkable yarn 26 within at least one of the courses 30 of each group of courses 30 skips at least one needle. In the embodiment shown, one of the pair of non-shrinkable yarns 26 in each group or plurality of course 30 is shown as being looped about alternating odd needles (1, 5, 9, 13 . . . ) and skipping every other odd needle (3, 7, 11 . . . ), thereby forming floats 32 of the non-shrinkable yarn 26 over the skipped needles. The resulting knitted structure of the wall 214 is shown in FIG. 10. This embodiment has been found particularly suitable for construction on a circular knitting machine, though other embodiments are contemplated herein, for knitting on both a flat-bed knitting machine or circular knitting machine.

Figure 11:
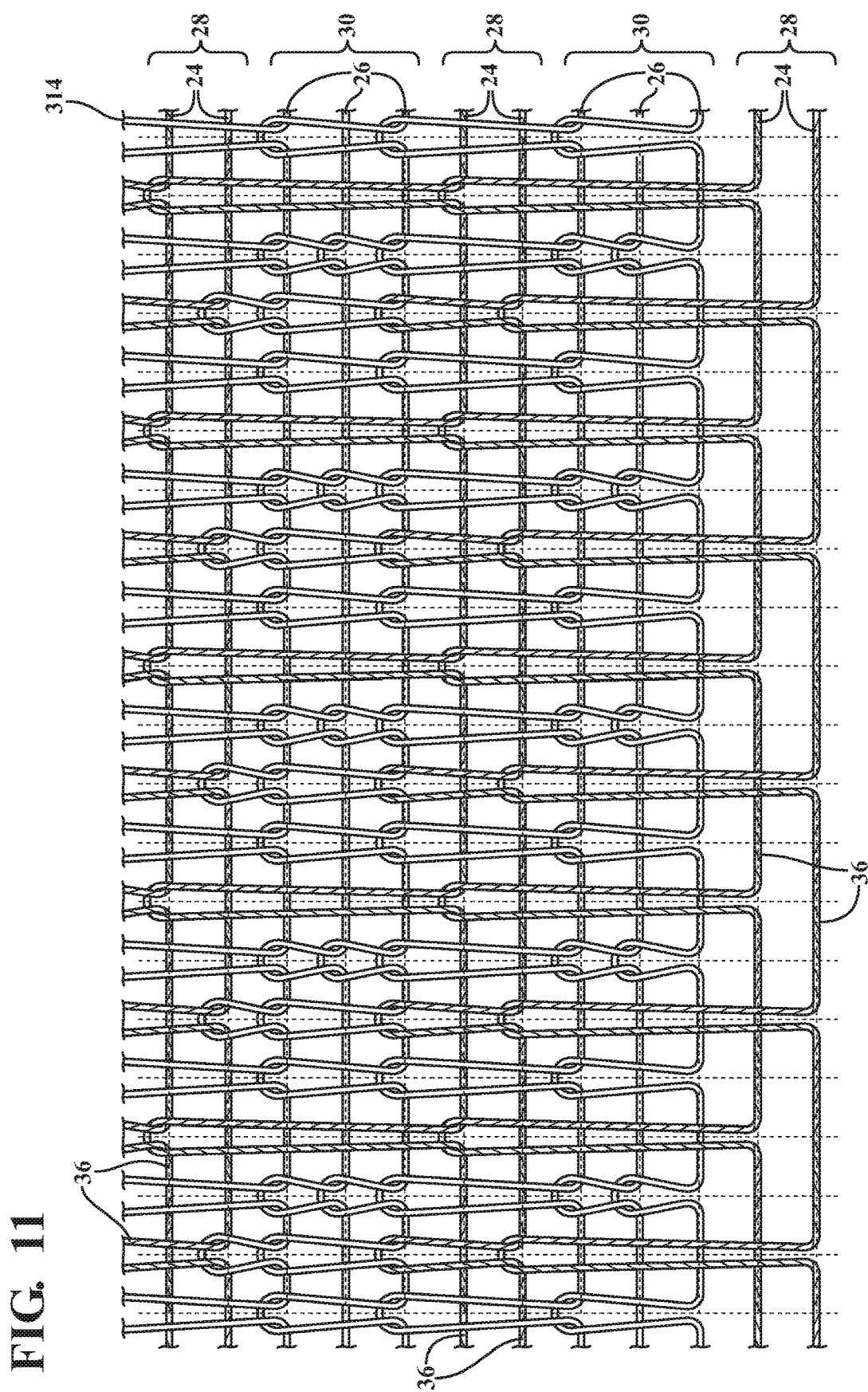
FIG. 11 is a diagram similar to FIG. 4 of a knitted structure for a sleeve constructed in accordance with another aspect of the invention.

In addition to the above knit structures and yarns described therefor, as shown in FIG. 11, a sleeve wall 314 constructed in accordance with another aspect of the disclosure is shown, wherein similar reference numerals as used above are used to indicate like features, offset by a factor of 300 wherein appropriate to indicate a different embodiment. In addition to shrinkable yarn 24 and the non-shrinkable yarn 26, can further include a low melt yarn 36. The low melt yarn 36 can be knit with the shrinkable yarn 24 and/or the non-shrinkable yarn 26, and is shown as being served or twisted with the shrinkable yarn 24, though it can also be served or twisted with the non-shrinkable yarn 26. The low melt yarn 36 has a melt temperature that is less than the melt and shrinking temperature of the shrinkable yarn 24 and less than the melt temperature of the non-shrinkable yarn 26, and thus, can be readily melted, at least in part, without adversely affecting the performance of the yarns 24, 26, and further, without activating shrinkage of the shrinkable yarn 24. As such, in manufacture, the low melt yarn 36 can be melted, and thus, bonded with the abutting shrinkable yarn 24 and the non-shrinkable yarn 26, thereby acting to prevent end fray. In accordance with one embodiment, a hot blade, wire or knife, by way of example and without limitation, can be used in a cutting operation of manufacture to cut the sleeve wall 314 to length, and thus, during the cutting operation, the low melt yarn 36 is simultaneously melted, thereby acting to prevent end fray without causing the shrinkable yarn 24 to be shrunk.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting elongate members, comprising:
    an elongate, knitted wall having a circumferentially continuous, tubular outer periphery extending along a central axis between opposite open ends, said wall includes shrinkable yarn and non-shrinkable yarn, said shrinkable yarn providing the wall with an ability to be radially constricted from a first, diametrically enlarged state to a second, diametrically shrunken state, wherein said shrinkable yarn is knit providing a plurality of circumferentially extending shrinkable courses and said non-shrinkable yarn is knit providing a plurality of circumferentially extending non-shrinkable courses, said plurality of circumferentially extending shrinkable courses and said plurality of circumferentially extending non-shrinkable courses alternating with one another.

2. The textile sleeve of claim 1, wherein a respective ratio of the diameters of said first, diametrically enlarged state and said second, diametrically shrunken state is greater than or equal to 1.5 to 1.

3. The textile sleeve of claim 1, wherein said non-shrinkable yarn forms circumferentially extending floats along an inner surface of the wall.

4. The textile sleeve of claim 3, wherein said shrinkable yarn, upon being shrunken, forms radially inwardly extending, lofted pillows from said floats of said non-shrinkable yarn.

5. The textile sleeve of claim 3, wherein said circumferentially extending floats skip a space occupied by at least one needle.

6. The textile sleeve of claim 1, wherein said shrinkable yarn is knit on one of even or odd needles and said non-shrinkable yarn is knit on the other of even or odd needles.

7. The textile sleeve of claim 1, wherein said shrinkable yarn is knit in one of an interlock stitch pattern or a jersey stitch pattern.

8. The textile sleeve of claim 1, wherein said non-shrinkable yarn is knit in an ottoman stitch pattern.

9. The textile sleeve of claim 1, wherein said wall has a first density when in said first, diametrically enlarged state and a second density when in said second, diametrically constricted state, with said second density being at least 2 times greater than said first density.

10. The textile sleeve of claim 1, wherein said wall can be knit including low melt fusible yarn that has a melt temperature that is less than the temperature required to shrink said shrinkable yarn and less than the melt temperature of said non-shrinkable yarn.

11. The textile sleeve of claim 10, wherein said low melt fusible yarn is twisted or served with at least one of said shrinkable yarn and said non-shrinkable yarn.

12. A method of constructing a textile sleeve, comprising:
    knitting an elongate wall having a circumferentially continuous, tubular outer periphery extending along a central axis between opposite open ends with shrinkable yarn and non-shrinkable yarn, the shrinkable yarn providing the wall with an ability to be radially constricted from a first, diametrically enlarged state to a second, diametrically shrunken state, wherein the shrinkable yarn is knit providing a plurality of circumferentially extending shrinkable courses and said non-shrinkable yarn is knit providing a plurality of circumferentially extending non-shrinkable courses, said plurality of circumferentially extending shrinkable courses and said plurality of circumferentially extending non-shrinkable courses are knit alternating with one another.

13. The method of claim 12, wherein a respective ratio of the diameters of the first, diametrically enlarged state and the second, diametrically shrunken state is greater than or equal to 1.5 to 1.

14. The method of claim 12, further including skipping at least one needle with the non-shrinkable yarn to form circumferentially extending floats along an inner surface of the wall.

15. The method of claim 14, further including forming radially inwardly extending, lofted pillows from the floats of the non-shrinkable yarn upon shrinking the shrinkable yarn.

16. The method of claim 12, further including knitting the shrinkable yarn on one of even or odd needles and knitting the non-shrinkable yarn on the other of even or odd needles.

17. The method of claim 12, further including knitting the shrinkable yarn in one of an interlock stitch pattern or a jersey stitch pattern.

18. The method of claim 12, further including knitting the non-shrinkable yarn in an ottoman stitch pattern.

19. The method of claim 12, further including knitting the wall having a first density when in the first, diametrically enlarged state and having a second density when in the second, diametrically constricted state, with the second density being at least 2 times greater than the first density.

20. The method of claim 12, further including knitting the wall including low melt fusible yarn that has a melt temperature that is less than the temperature required to shrink the shrinkable yarn and less than the melt temperature of the non-shrinkable yarn.

21. The method of claim 12, further including providing the low melt fusible yarn being twisted or served with at least one of the shrinkable yarn and the non-shrinkable yarn.

\* \* \* \* \*